C. B. MILLS.
ELECTROMAGNETIC BRAKE.
APPLICATION FILED MAR. 1, 1917.
1,368,345.
Patented Feb. 15, 1921.
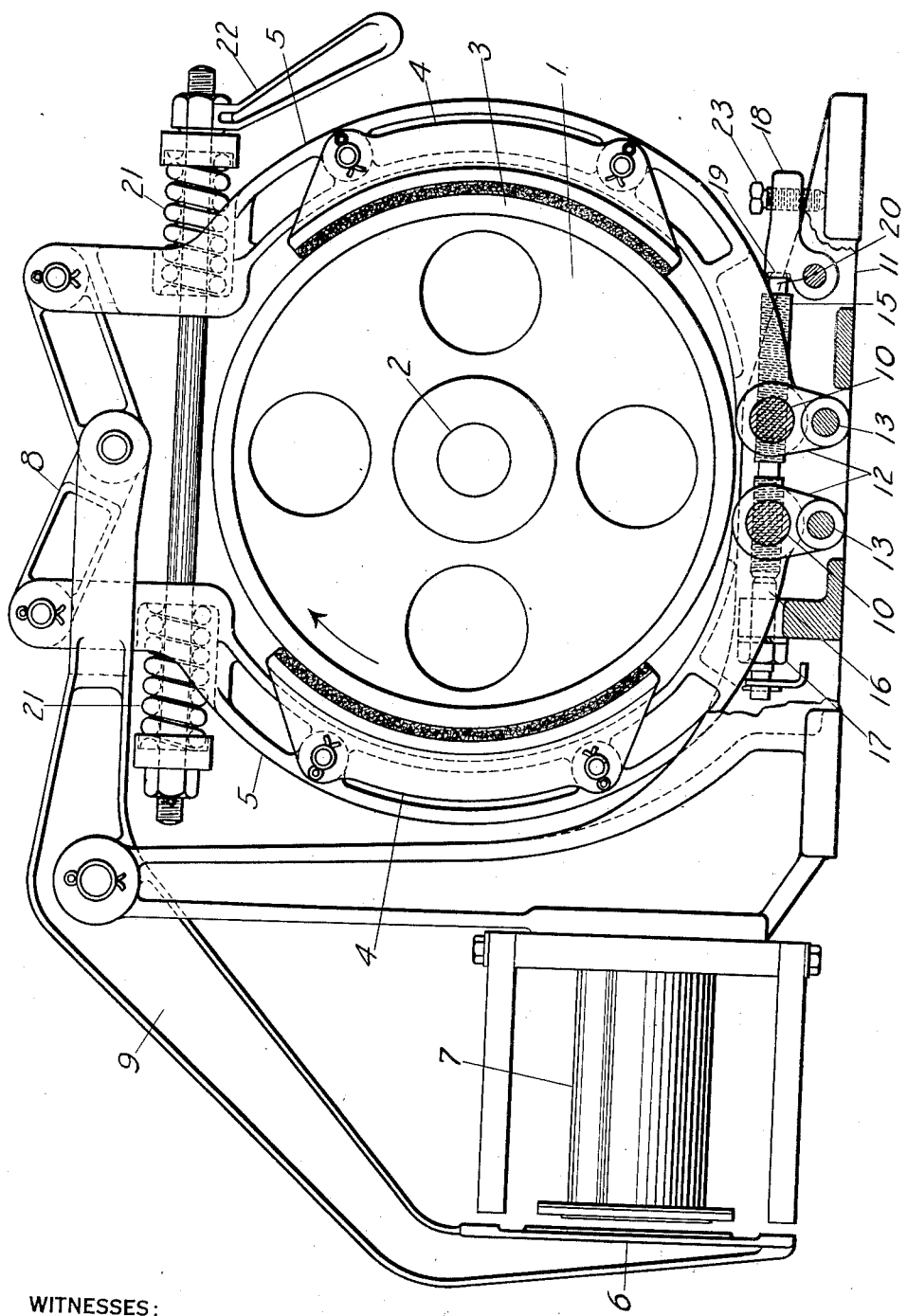
WITNESSES:
Fred. C. Wilharm
J. R. Langley
INVENTOR
Chester B. Mills
BY
Wesley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

ELECTROMAGNETIC BRAKE.

1,368,345.　Specification of Letters Patent.　Patented Feb. 15, 1921.

Application filed March 1, 1917. Serial No. 151,869.

*To all whom it may concern:*

Be it known that I, CHESTER B. MILLS, a citizen of the United States, and a resident of East McKeesport, in the county of Allegheny and State of Pennsylvania, have invented a new and useful Improvement in Electromagnetic Brakes, of which the following is a specification.

My invention relates to electromagnetic brakes for hoisting apparatus and similar mechanisms, and it has for its object to provide a simple and convenient means for adjusting brakes to compensate for wear incident to their use and thus maintain proper conditions for efficient operation.

In the operation of brakes that are controlled by electromagnets, it is necessary, at intervals, to adjust the relative positions of certain of the parts in order to maintain the proper relation between the armature members of the electromagnets and the stationary portions of the latter. The normal position of the movable member of an electromagnet varies, as the brake shoes become thinner because of wear, in such manner as to increase the air-gap between it and the coöperating stationary member, whereby the initial pull exerted by the electromagnet is materially decreased.

In a brake constructed in accordance with my invention, the usual brake levers are pivotally mounted upon a base or supporting member. An electromagnet operates through the usual lever mechanism to effect disengagement of the brake shoes from the wheel with which they coact. As the brake shoes become thinner because of wear, the air gap between the relatively movable parts of the electromagnet increases and the initial pull of the electromagnet is decreased to a corresponding degree.

The changes in the relative positions of the movable parts of the brake are compensated for by means of an arrangement whereby the points of pivotal support of the brake shoes are shifted relatively to each other and to the stationary supporting member. The shifting means comprises a bolt or screw provided with both right-hand and left-hand screw threads. The rotation of the screw-threaded member operates to increase or decrease the distance between the points of pivotal support, according as the member is rotated in the one or the other direction.

In the accompanying drawing, the single figure is a view, partially in elevation and partially in section, of a brake mechanism constructed in accordance with my invention.

A brake wheel 1 is mounted on a shaft 2 which may be connected to any suitable mechanism (not shown) such, for example, as an elevator motor or a hoist motor. The wheel 1 is provided with a suitable periphery 3 for engagement by brake shoes 4 that are respectively mounted upon opposite sides of the wheel. A pair of levers 5, each of which carries one of the brake shoes 4, is operatively connected to the armature member 6 of an electromagnet 7 by means of a toggle mechanism 8 and a pivotally mounted lever 9.

Each of the levers 5 is pivotally supported by a pin 10. Each of the pins 10 is pivotally connected to a base member 11 by means of a link 12 and a pin 13. The positions of the pins 10, relatively to each other and to the pins 13, are adjusted as desired by a bolt or screw 15 that is provided with right-hand and with left-hand screw threads at its respective end portions. The bolt 15 is retained in any position to which it may be adjusted by a stop member 16 that is in alinement therewith. The stop member 16 resists the torque exerted upon the brake mechanism when the latter is applied to the rotating wheel 1.

The stop member 16 may be adjusted longitudinally and it is retained in its adjusted position by means of a locking nut 17. A locking member 18, which is pivotally mounted adjacent to the opposite end of the bolt 15, is provided with a rectangular recess 19 for coacting with an end portion 20 of the bolt 15 that is of rectangular cross section. The locking member 18 thus prevents not only longitudinal movement of the bolt 15, but, also, such rotation as might, otherwise, be caused by shocks or jars incident to the operation of the brake. The brake levers 5 are normally held in such position that the brake shoes 4 are in engagement with the wheel 1, by springs 21. The tension of the springs may be varied by an adjusting nut 22.

During the operation of the brake, the bearing portions, or linings, of the brake shoes 4 wear away and the levers 5 normally occupy positions nearer the wheel 1 than is the case when the brake shoes 4 are in normal condition. The result is to cause the end of the lever 9 that is connected to the toggle mechanism 8 to assume a position that is lower than that normally occupied by it. The outer end of the lever 9 and the armature member 6 carried by it, assume positions at a constantly increasing distance from the electromagnet 7. If such abnormal conditions are permitted to continue, the length of the air-gap between the relatively movable parts of the electromagnet may increase to such degree as to seriously affect the operation of the brake. Furthermore, the efficiency of the brake is materially decreased.

To adjust the brake mechanism to compensate for the wear of the brake shoes, the adjusting screw 22 is actuated to remove the stress upon the springs 21. An adjusting screw 23 of the locking member 18 is turned to permit rotative movement of the member 18 in a clockwise direction about its point of pivotal support. The rectangular portion 20 of the bolt 15 is then disengaged from the recess 19 and the bolt may be turned by any suitable device such, for example, as a wrench for engaging the portion 20. The bolt 15 is turned to cause the pins 10 to approach each other. This movement is permitted by the links 12 which are pivotally connected to the stationary pins 13.

When the levers 5 occupy such positions that the air-gap of the electromagnet is of proper length, the bolt 15 is again locked in position by the locking member 18. The springs 21 are then placed under stress by the adjusting nut 22. While the pivot pins 10 are moved through an arc that is not concentric with the wheel 1, the clearances between the engaging portions of the several parts are such that the brake shoes 4 may conform to the surface of the wheel in the positions to which they are adjusted. This operation may be repeated whenever the wear of the brake shoes is such as to render a change in the length of the air-gap of the electromagnet necessary or advisable.

The arrangement whereby the positions of the brake levers may be adjusted to thereby vary the length of the air-gap of the controlling electromagnet affords a convenient method of quickly correcting abnormal conditions obtaining in the brake mechanism. It is possible, also, to employ the linings for the brake shoes for a materially longer period than is possible in brakes of ordinary construction which do not embody adjusting or compensating devices.

From the above, it will be obvious that the adjusting mechanism renders the operation and maintenance of brakes constructed in accordance with my invention not only more convenient but less expensive than is the case with brakes constructed in accordance with the prior art.

I claim as my invention:

1. The combination with a relatively stationary member having a pair of pivotal supports and a pair of relatively movable brake levers each having a pivotal support, of a pair of links respectively connecting said first-named supports to said second-named supports, and means for adjusting the positions of said second-named supports with respect to said first-named supports.

2. The combination with a supporting member, a magnet supported thereby having an armature member normally separated therefrom by an air gap, and a pair of brake levers each having a brake shoe, of a pair of links connecting said brake levers to said supporting member, a pair of links connecting said brake levers to each other and to said armature member, and means for adjusting the positions of said brake levers, to compensate for the wear of said brake shoes and to maintain the length of said air gap substantially constant.

3. In a brake mechanism, the combination with a brake lever, a power device operatively connected thereto, and a source of power for actuating said power device, of means for adjusting the position of said brake lever and thereby adjusting the position of the movable portion of said power device to maintain said power device in a normal position relative to said source of power.

4. In a brake mechanism, the combination with a brake wheel, a brake lever, a brake shoe supported thereby, a device for operating the lever, and an electromagnet for actuating said device, of means for adjusting the position of said lever relatively to said wheel to maintain the relative positions of said device and said electromagnet unchanged.

5. In a brake mechanism, the combination with a stationary member, a brake lever and a link pivotally connected to said stationary member and to said lever, of means, comprising a screw-threaded member, for adjusting the position of said link relatively to said stationary member and means for locking said screw-threaded member.

6. In a brake mechanism, the combination with a pair of brake levers and pivotal supporting means therefor, of means for adjusting the positions of the respective supporting means, said means comprising a member provided with both right-hand and left-hand screw-threads.

7. In a brake mechanism, the combination with a brake lever and means for pivotally supporting said brake lever, of means for adjusting the position of said supporting means, said adjusting means comprising a screw-threaded member provided with a rectangular end portion, means for adjusting said screw-threaded member, and means for locking said screw-threaded member in adjusted position comprising a member provided with a rectangular recess for engaging said end portion.

In testimony whereof, I have hereunto subscribed my name this 23rd day of Feb. 1917.

CHESTER B. MILLS.